(12) United States Patent
Lohwasser

(10) Patent No.: US 6,470,650 B1
(45) Date of Patent: Oct. 29, 2002

(54) PROCESS AND DEVICE FOR MANUFACTURING FORMS OF PACKAGING

(75) Inventor: Wolfgang Lohwasser, Gailingen (DE)

(73) Assignee: Alcan Technology & Management Ltd., Neuhausen am Rheinfall (CH)

( * ) Notice: Subject to any disclaimer, the term of this patent is extended or adjusted under 35 U.S.C. 154(b) by 0 days.

(21) Appl. No.: 09/532,959

(22) Filed: Mar. 22, 2000

(30) Foreign Application Priority Data

Apr. 28, 1999 (EP) ............................................. 99810359

(51) Int. Cl.[7] ................................................ B65B 47/00
(52) U.S. Cl. ........................................... 53/453; 53/559
(58) Field of Search .......................... 53/453, 559, 266.1

(56) References Cited

U.S. PATENT DOCUMENTS

| | | | |
|---|---|---|---|
| 5,155,981 A | * 10/1992 | Tordini | 198/468.4 |
| 5,269,123 A | * 12/1993 | Marchesini | 53/329.4 |
| 5,522,505 A | * 6/1996 | Giovannone | 206/462 |
| 5,783,273 A | * 7/1998 | Yamamoto et al. | 428/174 |
| 5,799,468 A | * 9/1998 | Eck et al. | 53/237 |
| 5,811,050 A | 9/1998 | Gabower | |
| 5,834,070 A | * 11/1998 | Movchan et al. | 427/126.1 |
| 5,846,608 A | * 12/1998 | Neumann et al. | 427/294 |

FOREIGN PATENT DOCUMENTS

EP 0463391 1/1992

* cited by examiner

Primary Examiner—Scott A. Smith
Assistant Examiner—Nathaniel Chukwurah
(74) Attorney, Agent, or Firm—Fischer, Christen & Sabol

(57) ABSTRACT

A process for manufacturing packaging (12) with good barrier properties against passage of water vapor and gases is such that recesses are shape-formed in a film-shaped material (22) to act as containers (26) to accommodate contents. After cutting the shape-formed film into individual units of packaging (12), these are coated in vacuum with materials exhibiting the desired barrier properties. A device for carrying out the process comprises a shaping station (14) for shape-forming the containers (26) from the film-shaped material (22), a cutting station (16) for cutting the packaging (12) out of the shape-formed, film-shaped material (22), and a vacuum-coating station (18) for coating the packaging (12). The process and the device make it possible to manufacture e.g. light-transparent blister packs within a packaging line, whereby the good barrier properties against passage of water vapor and gases can be achieved using relatively cost-favorable starting materials.

2 Claims, 1 Drawing Sheet

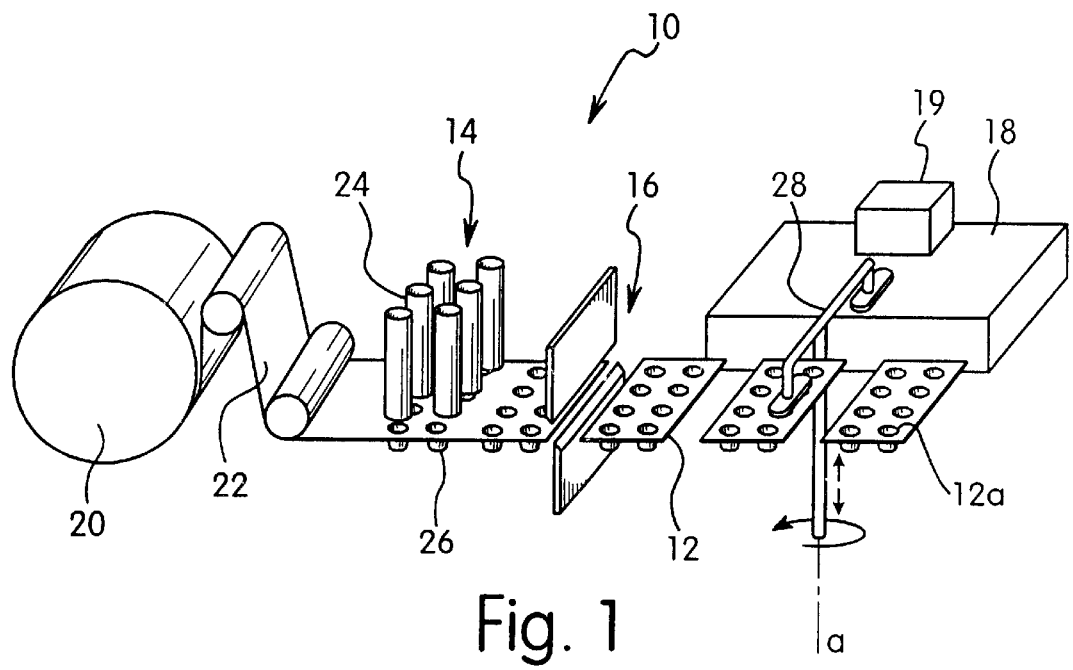
Fig. 1
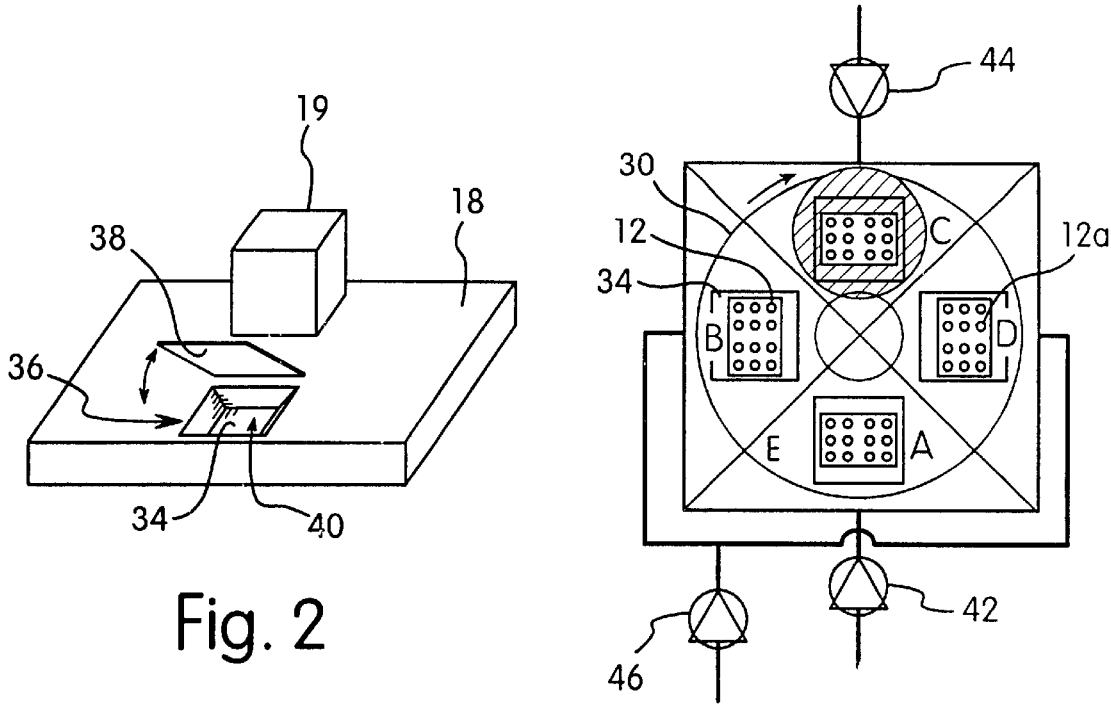
Fig. 2
Fig. 3

PROCESS AND DEVICE FOR MANUFACTURING FORMS OF PACKAGING

The present invention relates to a process for manufacturing forms of packaging having good barrier properties against the passage of water vapour and gases, featuring recesses of a first film-shaped material as containers to accommodate contents, where the film-shaped material is shape-formed to create the containers, cut into individual packaging, the contents added to the containers, and the filled packaging closed off by a second film-shaped material having good barrier properties against passage of water vapour and gases. Also within the scope of the invention is a device suitable for carrying out the process.

It is known to manufacture forms of packaging from a film-shaped material having shape-formed containers, such as the base parts of blister packs—also known as push-through packs—or other packaging containers such as menu-dishes and the like made e.g. by deep drawing, stretch drawing or thermoforming. The packaging forms may be made from thermoplastic materials or from film composites or laminates such as aluminium foil laminated onto plastic film, or extrusion coated layers of thermoplastic materials.

In order to achieve a form of packaging with good barrier properties against water vapour and gases—a so-called barrier layer—it is known to choose film-shaped or strip-shaped material which already exhibits the desired barrier properties for manufacturing the packaging. Starting materials are materials with organic barrier properties such as e.g. polyvinylidenchloride (PVDC) or a fluorine-containing polymer which has become known under the name Aclar®. Also known, as barrier layer for contents sensitive to oxygen, are polymers of ethylvinyl-alcohol. A film used in blister packs for tablets exhibits aluminium as barrier layer. Also known are plastic films whose barrier properties can be improved in some cases by depositing ceramic coatings or layers of aluminium by vacuum thin-film deposition using PVD (physical vapour deposition) or CVD (chemical vapour deposition) methods. Known for example are plastic films having a 10 to 200 nm thick layer of Al, $Al_2O_3$ or $SiO_x$, where x is a number between 0.9 and 2.

The above mentioned films with barrier properties suffer from substantial disadvantages. For example Aclar® and PVDC both contain chlorine, Aclar® also contains fluorine, for which reason the disposal of both materials is difficult. Furthermore, both materials are relatively expensive. EVOH is only suitable for foodstuffs as it does not exhibit good barrier properties against water vapour. Laminates having aluminium as barrier layer exhibit excellent barrier properties, but they are relatively expensive and exhibit limited formability.

A further disadvantage is the absence of light transparency, which is increasingly in demand in blister packs for tablets.

The object of the invention is therefore to provide a process for manufacturing packaging of the kind described at the start which does not exhibit the disadvantages of the state-of the-art processes. With the process in question it should be possible to produce different kinds of barrier properties in a simple and cost favourable manner.

That objective is achieved by way of the invention in which the barrier properties of the packaging against passage of water vapour and gases are created after shaping the container, this by means of vacuum coating with materials that exhibit the desired barrier properties.

The process according to the invention enables packaging forms to be manufactured from a large number of starting materials. Useful in particular are transparent plastics with good formability properties such as polyethylene (PE), polypropylene (PP), cyclo-olefine copolymers (COC), polyvinylchloride (PVC), polyethyleneterephthalate (PET), polyamide (PA) and laminates manufactured out of the above mentioned materials.

The coating of the packaging may be carried out on the inside or the outside of the container. Coating the outside permits e.g. the barrier layer to be deposited on the already filled and sealed pack.

The coating may be deposited by sputtering, vapour deposition or by plasma-polymerisation. A useful coating is comprised of metals or metal oxides. Preferred is sputtering metals, in particular aluminium or metal oxides, in particular $SiO_x$, where x is a number between 0.9 and 2, or plasma-polymerisation of silicon oxides, preferably starting from organosilanes such as hexamethyldisiloxane (HMDSO) or tetramethyldisiloxane (TMDSO). Also possible however is plasma-polymerisation of highly cross-linked carbohydrate layers, e.g. starting from methane, ethylene or acetylene.

In a particularly preferred version of the process according to the invention the production of the packaging, the coating and if desired the filling and closing are carried out in line.

A device which is suitable for carrying out the process according to the invention exhibits, besides a shape-forming station for shaping the containers out of the film-shaped material and a cutting station for cutting the packaging out of the shape-formed, film-shaped material, a vacuum coating station for coating the packaging.

A preferred version of the device according to the invention is such that the vacuum coating station exhibits a turntable for transporting the packaging within the station. Usefully, the turntable of the vacuum coating station can be loaded with the packaging to be coated via a gas lock, and the coated packaging removed via the gas lock.

The process according to the invention and the use of the device are particularly suitable for manufacturing blister packs with good barrier properties against passage of water vapour and gases whereby, depending on the choice of materials to be coated, light transparency or opacity can be achieved.

Further advantages, features and details of the invention are revealed in the following description of a preferred exemplified embodiment and with the aid of the drawing which shows schematically in:

FIG. 1 a perspective view of a unit for manufacturing packaging featuring a vacuum coating station;

FIG. 2 a perspective view of the vacuum coating station shown in FIG. 1;

FIG. 3 a plan view of the turntable of the vacuum coating station shown in FIG. 2.

A unit 10 for manufacturing forms of packaging 12—in the example shown base parts of blister packs—features a shape-forming station 14, a cutting station 16 and a vacuum coating station 18.

A material—for example polypropylene—in the form of a film 22 is unrolled from a coil 20 and fed to a shape-forming station 14 where containers 26 for the intended form of packaging are shaped using stamps 24. The shape-formed film 22 is cut into individual packaging 12 in the cutting station 16 which follows; the packs are then transferred to the vacuum coating station 18 by means of a robot arm 28. The unloading of the coated packaging 12a takes place using the same robot arm 28.

As shown in FIG. 3, the vacuum coating station 18 exhibits a turntable 30 with four stations to accommodate uncoated and coated packaging 12, 12*a*. These stations are in the form of moveable plates 34 recessed into the turntable, perpendicular to plane E of the turntable. By rotating the plates 34 in specific cycles around an angle of 90°, the plates pass through four sectors A, B, C and D of the vacuum coating station 18. The actual coating device 19 is situated over sector C.

As shown in FIG. 2, the vacuum coating station 18 exhibits a gas lock 36 for loading and unloading purposes. The gas lock is made up of a lid 38, which is sealed when closed, and the plate 34 in sector A. The plate 34 with the coated packaging 12*a* on it is pressed from below by a lever device (not shown here) against a seal situated at the edge of the gas lock 36 on the inner wall of the vacuum coating station 18, causing the vacuum coating station to be sealed against the outside atmosphere. After that, the space 40 between the plate 34 and the gas lock 36 is flooded with air and the lid 38 opened. The coated packs 12*a* are then exchanged for uncoated packs 12 by the robot arm 28. The robot arm 28 may e.g. be designed such that it simultaneously grips an uncoated and a coated pack e.g. by suction, moves in the direction of a robot axis of rotation a, after rotation of an angle of 180° around the robot axis a completes the exchange of both packs 12, 12*a*, and by means of a reverse movement in the direction of the robot axis a, lowers the pack 12 onto the plate 34. At the same time the coated pack 12*a* is again placed on the production line for further processing or for the containers 26 to be filled.

After setting the uncoated pack 12 onto the plate 34 in sector A, the gas lock 38 is closed and the space 40 between the plate 34 and the lid 38 evacuated. Following that the plate 34 bearing the uncoated pack 12 is again lowered using the lever device. During the charging step, the pack 12 in sector C is coated e.g. with vapour deposited aluminium. After charging a new pack 12 into sector A and completion of the coating in sector C, a new cycle begins. To that end the turntable 30 is rotated 90° so that the coated pack 12*a* is situated under the gas lock 36 and the uncoated pack 12 is situated in the coating zone in sector C.

The four sectors A, B, C and D are separated from each other in such a manner that their vacuum levels are independent of each other and that gas introduced on unloading does not enter the coating zone. Sectors B and D serve to provide better separation of the coating sector C from the loading/unloading sector A. As shown in FIG. 3, both of these zones—in addition to the pump 42 for the gas lock 36 and the pump 44 for the coating region in sector C—are provided with a further pump 46 which pumps off the gas entering through the loading/unloading zone and therefore also ensures defined vacuum conditions in the coating zone. The sectors B and D can also be omitted or can be used for further vacuum processes, e.g. a plasma pretreatment.

With the unit 10 it is possible to perform a coating operation in the coating zone in sector C—for example deposition of sputtered aluminium—and at the same time to maintain an almost continuous flow of material between the outer region and the vacuum region. By employing the described vacuum station 18 it is possible to integrate the coating step directly in the packaging/filling line—for example a blister pack line—and to do so in a simple manner. In order to achieve shorter cycle times it is however also possible to integrate two or more vacuum coating stations 18 in a packaging/filling line so that these always coat a set of packs 12 in an alternating manner.

Depending on the purpose for which the packaging 12 on the plate 34 is intended, the unfilled packs 12 may be coated on the inside or also on the outside. After coating the packs 12*a* are filled on the filling line and closed off e.g. with an aluminium foil lid.

From the drawing it can readily be seen that packs which have already been filled and sealed with a lid can be coated on the outside. To that end the vacuum coating station must feature a clamping facility which holds down the packaging with its thin foil lid to a flat plate, but leaves the shape-formed container freely exposed to the coating source. This measure is necessary as the atmospheric pressure inside the closed pack would cause the lid to tear.

What is claimed is:

1. A device comprising shaping station (14) for shape-forming container (26) from film-shaped material (22) and cutting station (16) for cutting packaging (12) out of the shape-formed, film-shaped material (22), cutting station (16) for cutting the packaging (12) out of the shape-formed, film-shaped material (22), and vacuum coating station (18) for coating the packaging (12), the vacuum coating station (18) includes a turntable (30) for transporting the packaging (12) within the vacuum coating station (18).

2. The device according to claim 1, wherein the turntable of the vacuum coating station (18) is loaded with the packaging (12) to be coated via gas lock (36), and coated packaging (12*a* ) is removed via the gas lock (36).

\* \* \* \* \*